United States Patent [19]

Okada

[11] Patent Number: 4,947,405
[45] Date of Patent: Aug. 7, 1990

[54] DC ARC FURNACE
[75] Inventor: Takeshi Okada, Gifu, Japan
[73] Assignee: Daidotokushijo Kabushikikaisha, Japan
[21] Appl. No.: 356,147
[22] Filed: May 24, 1989
[51] Int. Cl.$^5$ .............................................. H05B 7/00
[52] U.S. Cl. .................................... 373/72; 373/108
[58] Field of Search ...................... 373/72, 74, 76, 108
[56] References Cited

U.S. PATENT DOCUMENTS

| | | | |
|---|---|---|---|
| 4,566,108 | 1/1986 | Bühler | 373/108 |
| 4,685,112 | 8/1987 | Michelet et al. | 373/108 |
| 4,715,041 | 12/1987 | Bühler et al. | 373/108 |
| 4,815,096 | 3/1989 | Burwell | 373/74 |

Primary Examiner—Roy N. Envall, Jr.
Attorney, Agent, or Firm—William A. Drucker

[57] ABSTRACT

An upper electrode is mounted in the upper portion of a furnace and a bottom electrode is mounted in a bottom of the furnace. An electric arc is generated by introducing electric current to the upper and bottom electrodes and the raw materials charged in the furnace is melted. In the process of melting the materials, a mist of cooling water is sprayed by spray nozzles directly against the lower portion of the bottom electrode extruding downwards and the bottom electrode is cooled by the mist.

10 Claims, 3 Drawing Sheets

4,947,405

DC ARC FURNACE

BACKGROUND OF THE INVENTION

1. Field of the Invention

This invention relates to a DC arc furnace which is utilized in manufacturing steel principally from scraps as raw materials. It relates more particularly to a cooling structure for a bottom electrode provided in the bottom of the DC arc furnace.

2. Description of the Prior Art

The bottom electrode of the DC arc furnace utilized, for example, in manufacturing steel is in contact with molten metal at a temperature reaching 1600°~1800° C. and is additionally heated to a high temperature by the joule's heat generated by the high density electric current flowing through the electrode. Accordingly, the bottom electrode is rapidly wasted. Furthermore, there is a danger of leaking out of the molten metal resulting from the excessively melted bottom electrode and so the cooling of the bottom electrode is regarded as important. As the means of cooling this bottom electrode, there is following one. Namely, the bottom electrode is made in the form of a rod with its lower portion extruding downwards through the bottom of the furnace and a water-cooled jacket is additionally mounted around the extruding portion of the electrode. The lower portion of the bottom electrode is cooled by supplying cooling water to the water-cooled jacket.

In the means constructed as mentioned above, the heat in the bottom electrode conducts only to such portion of the cooling water that flows by along the internal surface of the wall of the cooling jacket. As the result, the cooling efficiency per unit quantity of the cooling water is low. Consequently, a large amount of cooling water is necessary in order to cool sufficiently the bottom electrode.

Furthermore, in the means of the above mentioned construction, the heat conduction between the lower portion of the bottom electrode and the water-cooled jacket becomes poor and the cooling efficiency is lowered the more if there is an air gap between the lower portion of the bottom electrode and the water-cooled jacket. It is therefore necessary to make the both members in contact over a wide ares to improve the heat conduction. However, the bottom electrode expands thermally in its radial direction on account of the heat generated by the operation of the furnace. Moreover, the amount of the expansion of the bottom electrode varies depending on if the expanding portion is close to or away from the bottom of the furnace since the temperature of the portion is different according to its location. Accordingly, it is very difficult to make the water-cooled jacket contact homogeneously with the lower portion of the bottom electrode over the above mentioned wide area.

SUMMARY OF THE INVENTION

An object of the present invention is to provide a DC arc furnace in which a sufficient cooling effect on the bottom electrode is obtained even with use of small amount of cooling water.

According to the present invention, a mist of cooling water is directly blown against the lower portion of the bottom electrode extruding downwards through the bottom of the furnace. Accordingly, the heat of the bottom electrode at a high temperature is transmitted to the mist through a large area per unit volume of the mist in contact with the electrode. As the result, the effect shows that the cooling effect on the bottom electrode is very sufficient even with small amount of cooling water.

Another object of the present invention is to provide a DC arc furnace in which the above mentioned sufficient cooling effect can be obtained with a simplified structure.

According to the present invention, it is the mist of cooling water that contacts directly with the bottom electrode. Thus spray nozzles have only to spray the mist at locations apart from the bottom electrode and the effect shows that a simple structure suffices for spraying the mist.

Still another object of the present invention is to provide a DC arc furnace in which the cooling of the bottom electrode is performed under safe conditions.

According to the present invention, the cooling water in the surroundings of the lower portion of the bottom electrode exists in the state of mist. Accordingly, even if the melt in the furnace should leak out to the neighborhood of the lower portion of the bottom electrode through the bottom of the furnace by any chance, only some of small particles of the cooling water in the form of a mist evaporate when they come in contact with the melt. Accordingly, such water vapor explosion that would take place when the molten metal of high temperature comes into contact with a large amount of cooling water is safely avoided of course.

Other objects and advantages of the invention will become apparent during the following discussion of the accompanying drawings.

DESCRIPTION OF THE PREFERRED EMBODIMENT

Figure 1:
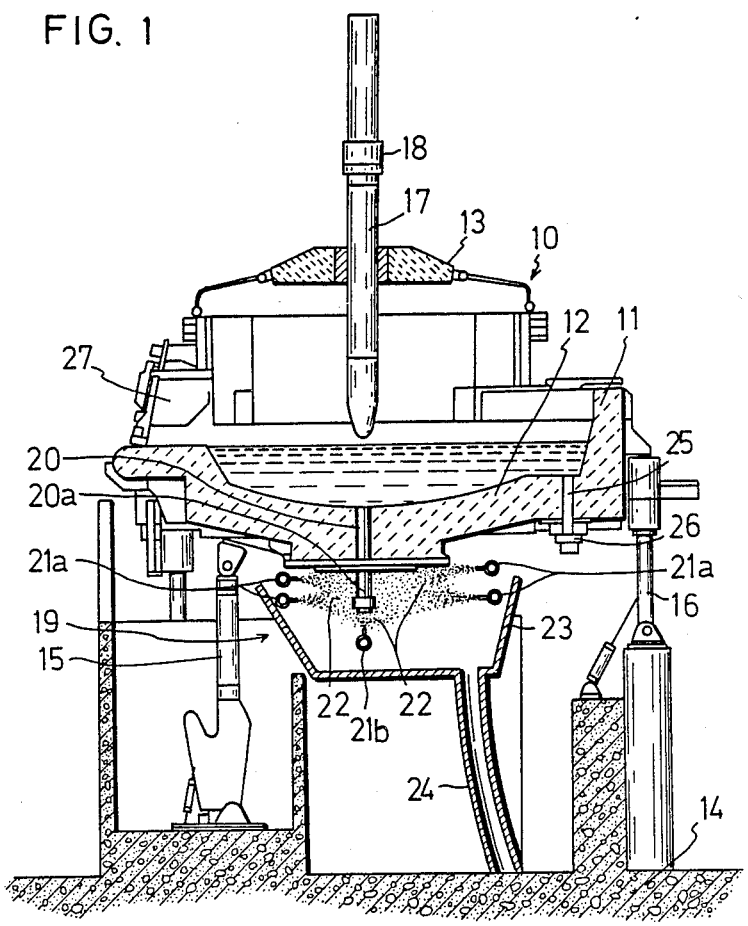
FIG. 1 is a front elevation in partial longitudinal section of a DC arc furnace.

A first embodiment of the DC arc furnace according to the present invention is shown in FIG. 1. A furnace 10 consists of a furnace main body 11 provided with a bottom 12 and of a lid 13. On a base 14 are mounted tilting mechanisms 15 and 16, which support the furnace 10 for inclining movement.

In the next place, an upper electrode equipment is explained. An upper electrode 17 is mounted through the lid 13, with the lower end thereof directed towards the central portion of the bottom 12 of the furnace main body 11. The upper electrode 17 is supported by an electrode clamp 18, an electrode supporting arm not shown and others, and is adapted to be raised and lowered by an electrode positioning device not shown. The upper electrode 17 is connected to the minus terminal, for example, of a DC power source via electrode bus bars, flexible wires, secondary bus bars and others.

Now a bottom electrode equipment 19 is explained. A bottom electrode 20 is shaped in the form of a bar, with the lower portion 20a thereof extruding downwards through the bottom 12 of the furnace main body 11 and being exposed under the bottom 12. The bottom electrode 20 is connected to the plus terminal, for example, of the aforementioned DC power source by lead wires not shown. A plurality of spray nozzles 21a and 21b are arranged around and under the lower portion 20a of the bottom electrode 20. These spray nozzles 21a and 21b are adapted to spray a mist 22 of cooling water against the lower portion 20a of the bottom electrode 20. Under the bottom electrode 20 and the spray nozzles 21a and 21b is provided a cooling water receiver 23, with which a drain tube 24 is communicated.

A tap hole 25 for discharge and a stopper 26 are provided in the right hand side of the bottom 12 in the furnace main body 11. Furthermore, a slagging door opening 27 is provided in the left hand side of the furnace main body 11.

The operation of the DC arc furnace constructed as mentioned above is as follows. Raw materials to be melted such as scraps and the like are charged into the furnace 10. The electric power for generating an electric arc is supplied to the upper electrode 17 and the bottom electrode 20 from the aforementioned DC power source. The electric arc is generated inside the furnace by the electric power in a well known manner and the raw materials are melted by the heat of the electric arc.

In the process of melting raw materials, the spray nozzles 21a and 21b arranged around and under the lower portion 20a of the bottom electrode 20 spray the mist 22 concentrically against the lower portion 20a. The mist 22 consisting of minute particles of cooling water comes directly in contact with the lower portion 20a of the bottom electrode 20 and the heat is rapidly transmitted from the bottom electrode 20 to the mist 22 through a large contact area per unit volume of the mist 22. As the result, the bottom electrode is effectively cooled. In comparison with the case of the water-cooled jacket system, the mist 22 consisting of much less cooling water can take the same cooling effect. Moreover, the situation under which the bottom electrode 20 is cooled by the mist 22 can be confirmed by inspection since the mist 22 is visible.

When a DC arc furnace of a capacity of 20 tons is cooled by the water-cooled jacket system, the number of possible times of melting is 600. On the other hand, when the lower portion 20a of the bottom electrode 20 in the DC arc furnace of the same capacity is cooled by the mist 22 sprayed by the spray nozzles 21a and 21b, the number of possible times of melting has been increased to 800. Furthermore, the quantity of water necessary for the mist 22 per one time of melting is much less than the quantity of water necessary for the water-cooled jacket which can take the same cooling effect.

In the above mentioned embodiment, the single upper electrode 17 and the single bottom electrode 20 are utilized. However, the combination of the single upper electrode 17 and a plurality of bottom electrodes 20, of a plurality of upper electrodes 17 and the single bottom electrode 20 or of a plurality of upper electrodes 17 and a plurality of bottom electrodes 20 is possible.

FIGS. 2~5, other embodiments of the bottom and the bottom electrode equipment are shown. In these figures and FIG. 1, members to which the same reference numeral is allotted are same or similar in construction or same in function. The alphabets e~g affixed to the reference numeral are used in order to discriminate different embodiments. The explanation common to the members with the same reference numeral is given once at the first time and is not repeated.

Figure 2:
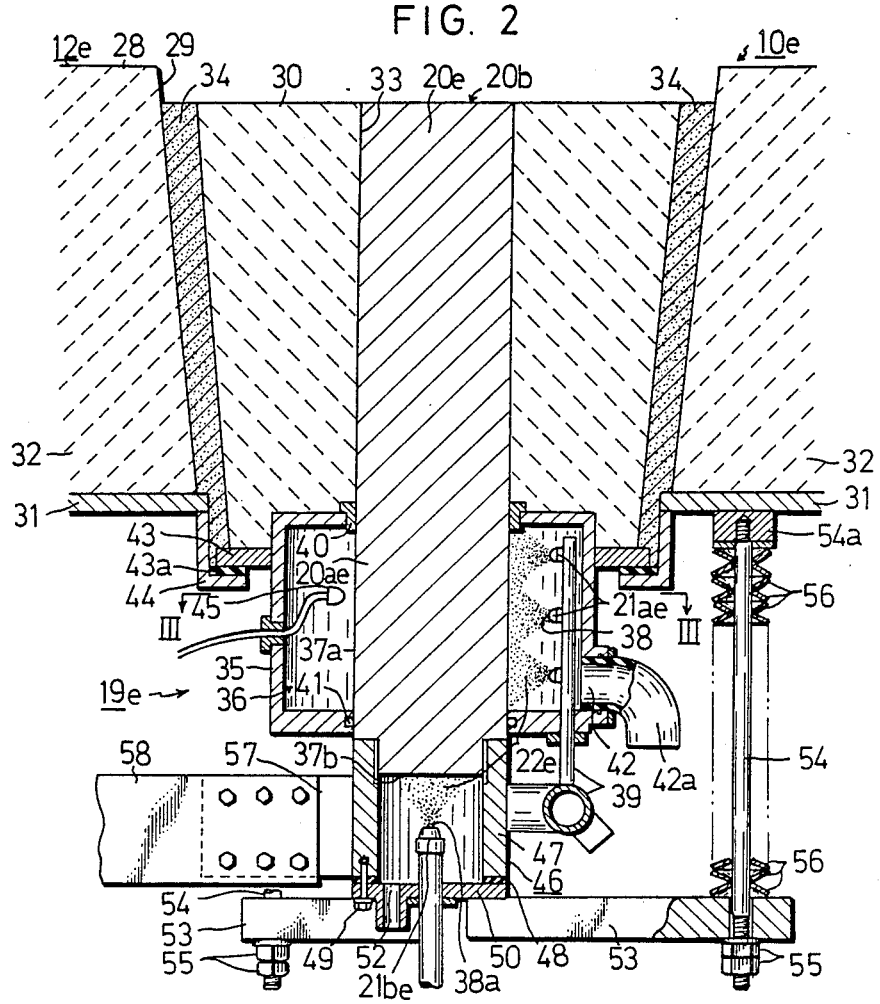
FIG. 2 is a longitudinal section showing a different embodiment of the bottom electrode equipment.
Figure 3:
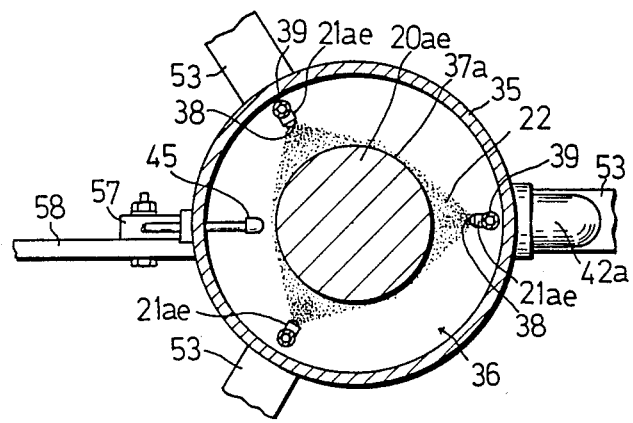
FIG. 3 is a section taken along the line III—III in FIG. 2.

In the embodiment given in FIGS. 2 and 3, a bottom 12e consists of a main body portion 28 formed with a through hole 29 and of an annular member 30 adapted removably in the through hole 29. The main body portion 28 consists of an iron shell 31 lined with refractories 32. The inner circumferential side surface of the through hole 29 is shaped in the form of a tapered cylinder with an upper larger diameter and a lower smaller diameter. The annular member 30 is made of refractories similar to that of the main body portion 28. The annular member 30 is formed with a bottom electrode insertion hole 33 and the upper and intermediate portions of a bottom electrode 20e is passed through the insertion hole 33. The outer circumferential surface of the annular member 30 is shaped in the form of a tapered cylinder similar to that of the through hole 29. The outer diameter of the annular member 30 is made slightly smaller than the diameter of the through hole 29 and a granular refractory 34 is stuffed between the both members. This refractory 34 functions to secure the annular member 30 against the refractories 32 and constitutes a part of the bottom 12e.

A bottom electrode equipment 19e includes the bottom electrode 20e, a cooling means for cooling the bottom electrode 20e, a positioning means for positioning the bottom electrode 20e and a connection means for connecting electrically the bottom electrode 20e.

The bottom electrode 20e is made of steel, for example, and an apex surface 20b thereof is adapted to be in electric contact with scraps charged onto the bottom 12e as the raw materials to be melted or the melt resulting from the scraps.

In the next place, the cooling means is explained. A circumferential side surface 37a of a lower portion 20ae of the bottom electrode 20e is surrounded by a first housing 35. The housing 35 is an annular steel body with rectangular cross section and is open at the inner side thereof. A spray chamber 36 is formed in the housing 35 and is surrounding the circumferential side surface 37a of the lower portion 20ae of the bottom electrode 20e. In this spray chamber 36, are arranged a plurality of spray nozzles 21ae, each having a spray opening 38 directed towards the circumferential side surface 37a of the lower portion 20ae. A cooling water feed path 39 is provided in order to supply water to each spray nozzle 21ae and is communicated with a source of cooling water not shown. Annular sealing members 40 and 41 are padded between the bottom electrode 20e and the inner edge of the housing 35 for the purpose of watertight seal. A drain outlet 42 is provided in the lower end portion of the housing 35 and is communicated with a drain hose 42a made of electrically insulating material. An annular flange plate 43 is secured at the outer circumference of the housing 35 and is supported, via an insulator 43a made of, for example, an asbestos board, by a flange member 44 provided fixedly on the iron shell 31. A sensor 45 of an optical fiber type radiation thermometer is provided inside the housing 35, is directed towards the lower circumferential side surface 37a of the bottom electrode 20e and is connected to a thermometer main body not shown.

On the other hand, a bottom surface 37b of the lower portion 20ae is surrounded by a second housing 46. The housing 46 consists of a copper cylindrical member 47 and a bottom plate 50 bound to the lower end of the cylindrical member 47 by bolts 49 with an insulator 48 sandwiched between the lower end and the bottom plate 50. The upper end of the cylindrical member 47 is screwed to the lower end portion of the bottom electrode 20e. A washer made of insulating material is inserted between the head of the bolt 49 and the bottom plate 50 and a sleeve made of insulating material between the bolt 49 and the circumferential side surface of a bolt hole in the bottom plate 50 although they are not shown in the figures. Thus the cylindrical member 47 is electrically insulated from the bottom plate 50. A lower spray nozzle 21be with a spray opening 38a is provided inside the housing 46 and the spray opening 38a is directed towards the bottom surface 37b of the bottom electrode 20e. The lower spray nozzle 21be is communicated with a source of cooling water not shown. A drain outlet 52 for the lower spray nozzle 21be is provided in the bottom plate 50.

Now the positioning means is explained. Three electrode support bars 53 are radially secured on the bottom plate 50. The lower end of a hanging bar 54 fits in the end of the electrode support bar 53 and the upper end of the hanging bar 54 is screwed in a base 54a welded to the iron shell 31. A reference numerals 55 represents positioning nuts for the electrode support bars 53 and a reference numeral 56 a plurality of compression springs in the form of a coned disc spring for biasing the electrode support bar in the downwards direction.

In the next place, the connection means is explained. A copper terminal board 57 is secured to the cylindrical member 47 so as to extrude from the member and is connected with a conductor 58 connected, in turn, to the DC power source of the furnace.

In the arc furnace constructed as mentioned above, the bottom electrode 20e reaches a high temperature due to the heat transmitted to the bottom electrode 20e from the melt and the joule's heat generated by the arc current. The spray nozzles 21ae and 21be spray the cooling water in the form of a mist 22e against this bottom electrode 20e and cool the same. Since the minute particles of the cooling water come into direct contact, in succession, with the circumferential side surface 37a and the bottom surface 37b of the lower portion 20ae of the bottom electrode 20e, the bottom electrode 20e is cooled reliably and effectively and the temperature rise of the bottom electrode 20e is suppressed within a certain limit.

In the case of the above mentioned cooling operation, the first and second housings 35 and 46 function as a cooling water receiver. Accordingly, the cooling water which has been sprayed against the bottom electrode 20e is received by the first and second housings 35 and 46. Since the received water is drained from the bottom portion of the respective housing through the drain outlets 42 and 52, respectively, the cooling water scarcely remains in the housings 35 and 46. As the result, even if the melt on the bottom 12e should penetrate the gap between the hole 33 and the bottom electrode 20e and leak out downwards, there is scarcely any possibility of water vapor explosion. In order that the cooling water is drained more reliably and any remaining water is excluded, it is especially preferable to communicate a forced draining means such as an ejector with the drain outlets 42 and 52.

When the melt remaining on the bottom 12e solidifies after the operation of the furnace, the melted part of the bottom electrode solidifies as well. At this time, the bottom electrode 20e is pulled slightly upwards on account of constriction. However, when the previously solidified portion of the bottom electrode 20e is again melted at the next operation of the furnace, the bottom electrode 20e is pulled back to the prescribed lower most position by the compression springs 56 via the electrode support bar 53. As the result, that portion of the bottom electrode 20e which has been pulled up is prevented from being uselessly consumed at every time of the furnace operation.

In the past, the temperature of the bottom electrode was indirectly monitored by measuring the temperature of the refractories in the surroundings of the bottom electrode or of the cooling water. Therefore, the temperature of the bottom electrode can not be accurately determined and the response of measurement to the change of the temperature at the bottom electrode was slow. In the present embodiment, however, the temperature of the bottom electrode 20e is directly measured by the optical fiber type radiation thermometer and thus can be accurately monitored.

When the bottom electrode 20e is exchanged after it has been consumed due to a long term use, the drain outlet 42, the bottom plate 50, the conductor 58 and others are first removed, such members as the bottom electrode 20e and the cylindrical member 47 can be next pulled upwards into a furnace 10e together with the annular member 30 in the form of the tapered cylinder and these members are removed there. New members such a new bottom electrode are mounted from inside the furnace 10a. Thus, a large space for the exchange of the bottom electrode is unnecessary under the furnace 10e.

Figure 4:
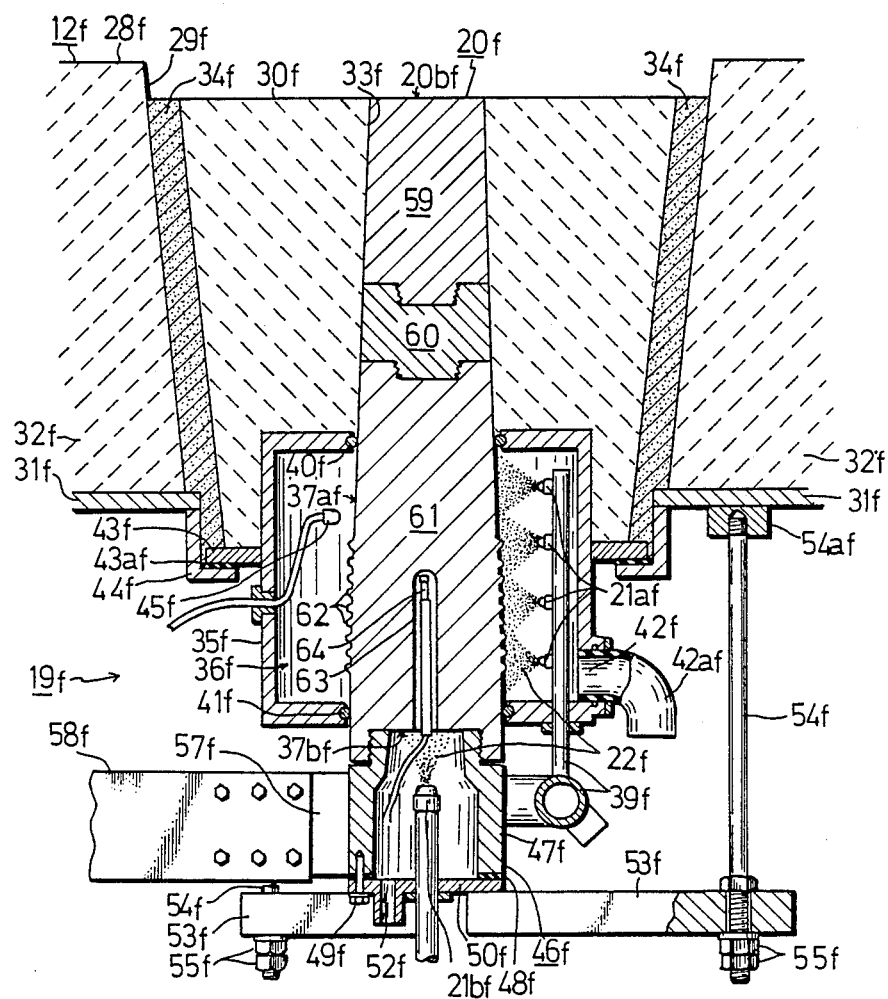
FIG. 4 is a section similar to FIG. 2, showing a still different embodiment of the bottom electrode equipment

A still other embodiment of the bottom electrode equipment according to the present invention is shown in FIG. 4. A bottom electrode 20f consists of a soft iron bar 59, a graphite coupling 60 and a copper bar 61. These members are connected to one another by screwing and form, as a whole, the bottom electrode 20f in the form of a tapered cylinder with an upper smaller diameter and a lower larger diameter. A bottom electrode insertion hole 33f is shaped as well in the form of a similar tapered cylinder. The copper bar 61 is plated with chrome on the surface thereof and formed with a several annular rising stripes 62 on the circumferential surface thereof. In this embodiment, the compression springs 56 used in the previous embodiment are not adopted. In the axial portion of the bottom electrode 20f is bored a thermocouple insertion hole 63 with a closed upper end and a thermocouple 64 is inserted in the hole. This thermocouple is adapted to measure directly the temperature at the inner portion of the insertion hole 63.

In a bottom electrode equipment 19f constructed as mentioned above, the bottom electrode 20f is effectively cooled as in the bottom electrode equipment 19e shown in FIGS. 2 and 3. The bottom electrode 20f is shaped in the form of a tapered cylinder with an upper smaller diameter and a lower larger diameter. Accordingly, even when the soft iron bar 59 is melted and solidified repeatedly in the course of frequent furnace operations, the bottom electrode 20f is not pulled upwards. Since the graphite coupling 60 is superior in heatresisting property, even if the soft iron bar 59 should be fully melted or the melt should descend onto the coupling 60, the coupling 60 will not be melted and the melted soft iron and the melt are prevented from descending farther. The copper bar 61 generates only small joule's heat on account of the low electric resistivity thereof and enhances the cooling effect on the soft iron bar 59 and the coupling 60 on account of the superior heat conduction property thereof. In addition, the rising stripes 62 formed on the surface of the copper bar 61 increase the area for heat transmission and produce an additional cooling effect by disturbing the cooling water which is sprayed and flows down along the surface of the copper bar 61. In this manner, the properties of the copper bar 61 and the form of the rising stripes 62 contribute to the cooling effect and the temperature of the bottom electrode 20f is suppressed within a certain limit. The plate on the surface of the copper bar 61 prevents the copper bar 61 from being deteriorated by the cooling water and maintains a satisfactory cooling effect for a long term. A hanging bar 54f and an electrode support bar 53f prevent the bottom electrode 20f from slipping off.

The temperature at the vicinity of the bottom of the insertion hole 63 is now measured by the thermocouple 64. This temperature becomes higher as the soft iron 59 is consumed the more and an apex surface 20bf approaches the bottom of the insertion hole 63 the closer. Since the relationship between the degree of the consumption of the soft iron bar 59 and this temperature is empirically known, the degree of the consumption of the soft iron bar 59 can be easily monitored by measuring this temperature.

Figure 5:
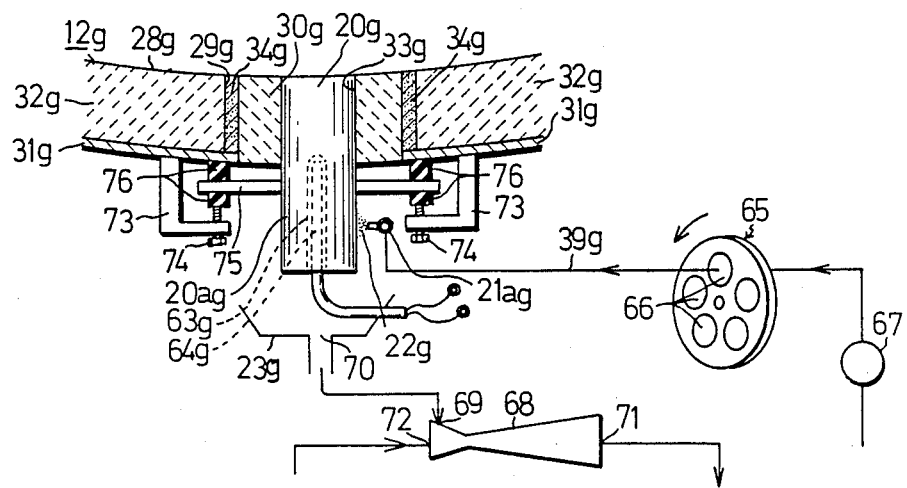
FIG. 5 is a schematic view showing a different embodiment concerning the feed and drain of cooling water.

In the next place, a different embodiment of the means for the feed and drain of cooling water is shown in FIG. 5. A filter equipment 65 is mounted intermediately of a cooling water feed path 39g and a filter element 66 is adapted to be exchanged one by one after each prescribed time for which the cooling water has been fed. One end of the feed path 39g is communicated with a feed water pump 67 and the other end with spray nozzles 21ag.

An ejector 68 shown as an example of a forced draining means is communicated, at an inlet 69 thereof, with a drain outlet 70 of a cooling water receiver 23g. On the lower surface of the iron shell 31g are secured a plurality of support pieces, for example, L-shaped angles 73. Positioning bolts 74 are screwed to the horizontal arm of the angle 73. A flange plate 75 is fastened directly on the circumferential side surface of a bottom electrode 20g. Insulators 76 are interposed between the edge of the flange plate 75 and the iron shell 31g and between the upper surface of the bolt 74 and the edge of the flange plate 75 in order to insulate electrically the bottom electrode 20f from the iron shell 31g. The flange plate 75 is pressed against the iron shell 31g by the bolt 74 via the insulators 76 and positioned in the vertical direction.

In the embodiment constructed as mentioned above, the filter equipment 65 is rotated by one step angle after the cooling water has been fed for a certain duration. The used filter element 66 gets out of the cooling water feed path 39g and one of new elements 66 is mounted intermediately of the cooling water feed path 39g to filter the cooling water. In this manner, the filter elements 66 are automatically exchanged and a flow of clean cooling water is always supplied.

To a driving port 72 of the ejector 68 is supplied water or steam for driving. Even when the cooling water drops into the cooling water receiver 23g from the surroundings of the bottom electrode 20g and from the spray nozzles 21ag while the bottom electrode 20g is cooled by the mist 22g, the cooling water is sucked from the inlet 69 of the ejector 68 to be swiftly drained from an outlet 71 and does not remain in the cooling water receiver 23g. Consequently, even though the melt leaks out into the cooling water receiver 23g through a bottom 12g, the danger of water vapor explosion can be avoided more safely. As the forced draining means, a mechanical pump may be utilized.

As many apparently widely different embodiments of the invention may be made without departing from the spirit and scope thereof, it is to be understood that the invention is not limited to the specific embodiments thereof except as defined in the appended claims.

What is claimed is:

1. A DC arc furnace comprising:
   (a) a furnace having upper and bottom portions,
   (b) an upper electrode mounted in the upper portion of said furnace,
   (c) a bottom electrode in the shape of a tapered cylinder with an upper smaller diameter and a lower larger diameter mounted in said bottom portion of said furnace, said bottom electrode being extruding, at the lower portion thereof, downward through said bottom, said lower portion having plural ring rising stripes on the outer circumferential surface thereof, and
   (d) spray nozzles arranged in the surroundings of said lower portion for spraying a mist of cooling water against said lower portion.

2. A DC arc furnace as set forth in claim 1 wherein said spray nozzles consist of spray nozzles for spraying the mist against the circumferential side surface of said lower portion and a spray nozzle for spraying the mist against the bottom surface of said lower portion.

3. A DC arc furnace as set forth in claim 1 wherein a first housing surrounding the circumferential side surface of said lower portion and a second housing surrounding the bottom surface of said lower portion are provided, said spray nozzles for spraying the mist against said circumferential side surface is mounted in said first housing and said spray nozzle for spraying the mist against said bottom surface is mounted in said second housing.

4. A DC arc furnace as set forth in claim 1 wherein said bottom of the furnace consists of a furnace main body formed with a through hole and an annular member formed with a bottom electrode insertion hole and adapted removably in said through hole and said bottom electrode is inserted in said bottom electrode insertion hole.

5. A DC arc furnace as set forth in claim 4 wherein the inner circumferential side surface of said through hole and the outer circumferential side surface of said annular member are both shaped in the form of a tapered cylinder with an upper larger diameter and a lower smaller diameter and a granular refractory is stuffed between said inner and outer circumferential side surfaces.

6. A DC arc furnace as set forth in claim 5 wherein said bottom electrode and said bottom electrode insertion hole are both shaped in the form of a tapered cylinder with an upper smaller diameter and a lower larger diameter.

7. A DC arc furnace as set forth in claim 1 wherein a cooling water receiver is provided for receiving the cooling water flowing down from the surroundings of said bottom electrode and said water receiver is provided with a forced draining means for draining forcibly the cooling water received there.

8. A DC arc furnace as set forth in claim 1 wherein in a cooling water feed path for said spray nozzles is interposed a filter equipment in which a filter element is adapted to be exchanged one by one after each prescribed duration of water feed.

9. A DC arc furnace as set forth in claim 1 wherein a thermocouple insertion hole with a closed bottom is bored in the axial portion and from the bottom surface of said bottom electrode and a thermocouple for measuring the temperature at the inner portion of said insertion hole is inserted in said insertion hole.

10. A DC arc furnace as set forth in claim 1 wherein said bottom of said furnace consists of an iron shell and refractories lined on said iron shell and said iron shell is electrically insulated from said bottom electrode.

* * * * *